June 20, 1967   O. B. CRUSE   3,326,090
FRICTION DEVICE OPERATING MECHANISM
Filed April 29, 1965   3 Sheets-Sheet 1

INVENTOR
OLIVER B. CRUSE
BY
Joseph E. Papin

June 20, 1967 O. B. CRUSE 3,326,090
FRICTION DEVICE OPERATING MECHANISM
Filed April 29, 1965 3 Sheets-Sheet 2

INVENTOR
OLIVER B. CRUSE
BY
*Joseph E. Papin*

INVENTOR
OLIVER B. CRUSE
BY
Joseph E. Papin.

United States Patent Office 3,326,090
Patented June 20, 1967

3,326,090
FRICTION DEVICE OPERATING MECHANISM
Oliver B. Cruse, Florissant, Mo., assignor to Wagner Electric Corporation, St. Louis, Mo., a corporation of Delaware
Filed Apr. 29, 1965, Ser. No. 451,764
1 Claim. (Cl. 92—24)

ABSTRACT OF THE DISCLOSURE

Retention means for a spring set brake device operable in response to control fluid pressure to positively contain the force of an emergency spring and also operable in response to emergency fluid pressure supplied to actuate said spring set brake device under emergency conditions to release said emergency spring wherein the force thereof is additive to that of the emergency fluid pressure for effecting emergency operation of said spring set brake device.

---

Figure 1:
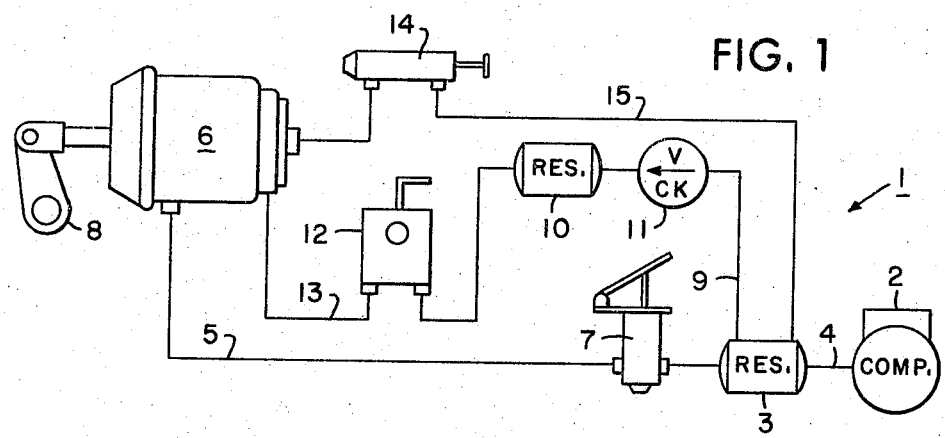

This invention relates to friction device operating mechanisms and in particular to those having emergency actuating means therein.

In the past, friction device operating mechanisms were provided with an actuator, such as a diaphragm, responsive to fluid pressure selectively applied thereto from a fluid pressure source for normally energizing a friction device of a vehicle, and resiliently urged means were also provided for driving engagement with the diaphragm to mechanically energize said friction device when the fluid pressure supplied to said resiliently urged means from said source was reduced to a predetermined low value. One of the disadvantageous or undesirable features of such past friction device operating mechanisms was that in the event of a rupture in the diaphragm thereof it was necessary to exhaust or bleed off the fluid pressure from the source through said rupture until the predetermined low value was attained before the resiliently urged means was effective to mechanically energize the friction device; and during such an exhaust or bleed off period, the friction device was, of course, inoperable. Another disadvantageous or undesirable feature of such past friction device operating mechanisms was that when the resiliently urged means was effective upon the attainment of the predetermined low fluid pressure value at the source to mechanically energize the friction device, such energization was controlled, i.e., too sudden, too intense and too erratic, which often caused the operator to lose control of the vehicle.

The main object of the present invention is to provide a friction device operating mechanism which overcomes the aforementioned undesirable and disadvantageous features of the past friction device operating mechanims, and these and other objects and advantages of the present invention will become apparent hereinafter.

Briefly, the present invention embodies a friction device operating mechanism having a pair of actuators therein respectively responsive to fluid pressure supplied thereto to energize a friction device, and resiliently urged means for driving said actuators to mechanically energize said friction device, one of said actuators being also responsive to fluid pressure applied to the other of said actuators to move said resiliently urged means toward an inoperative position for releasable retention therein.

Figure 2:
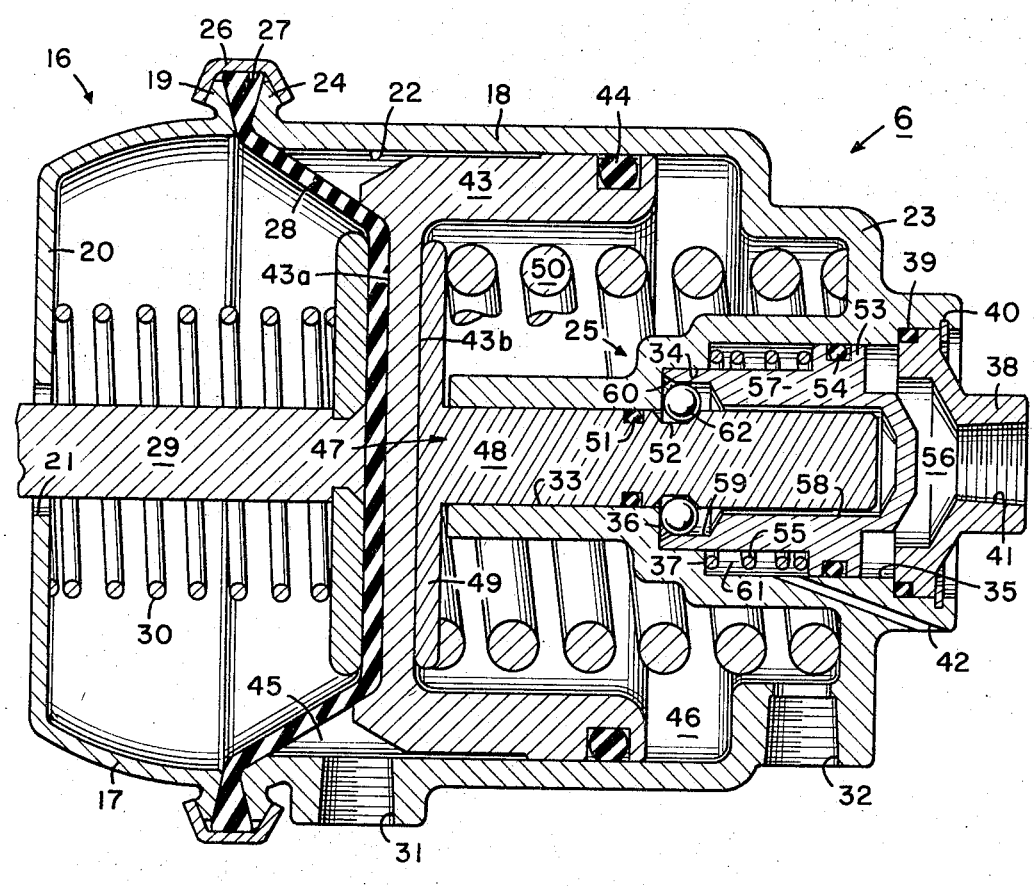
Figure 3:
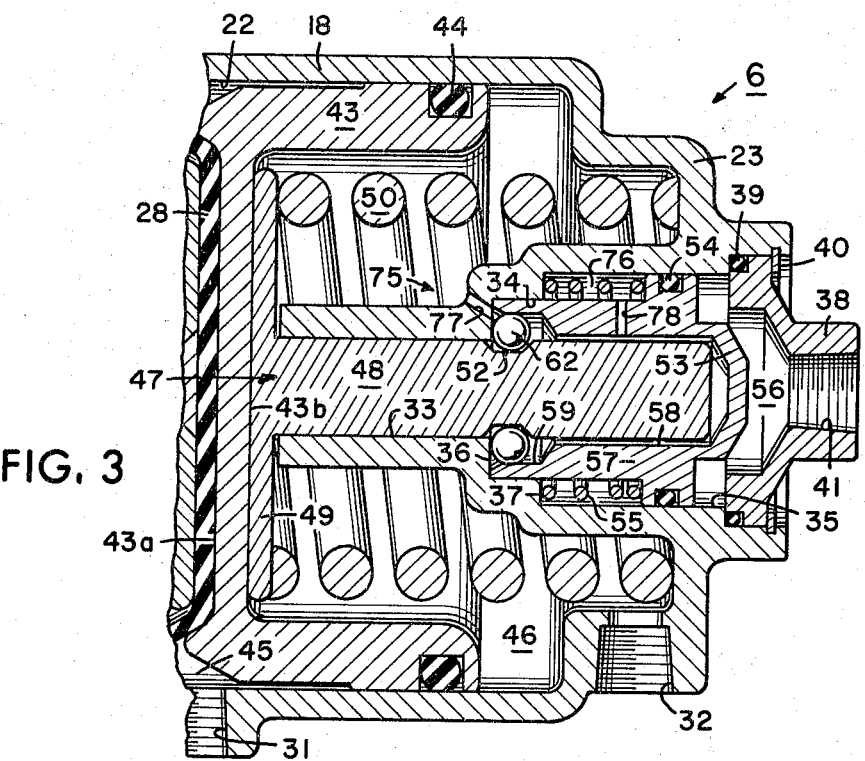
Figure 5:
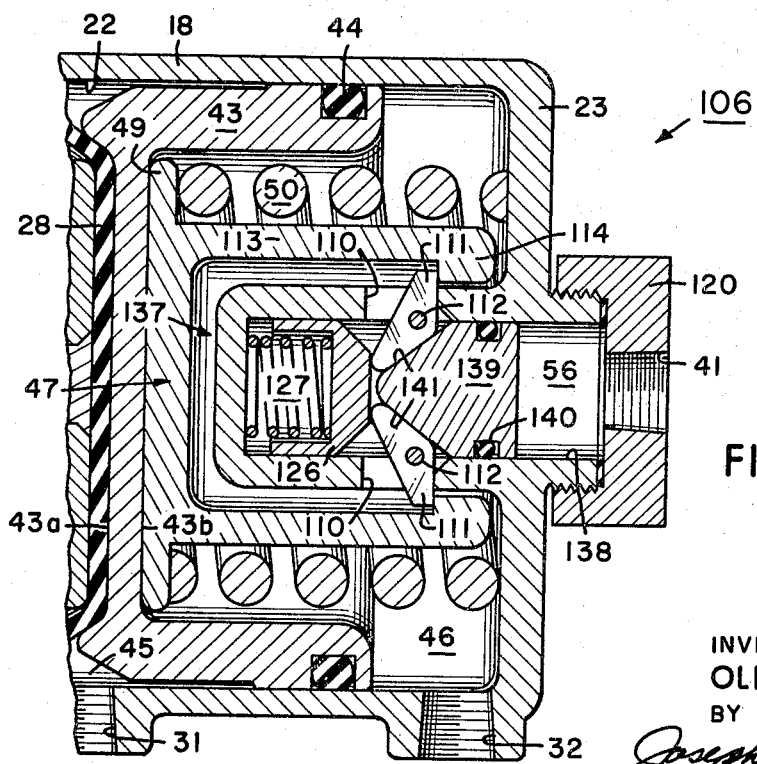
Figure 4:
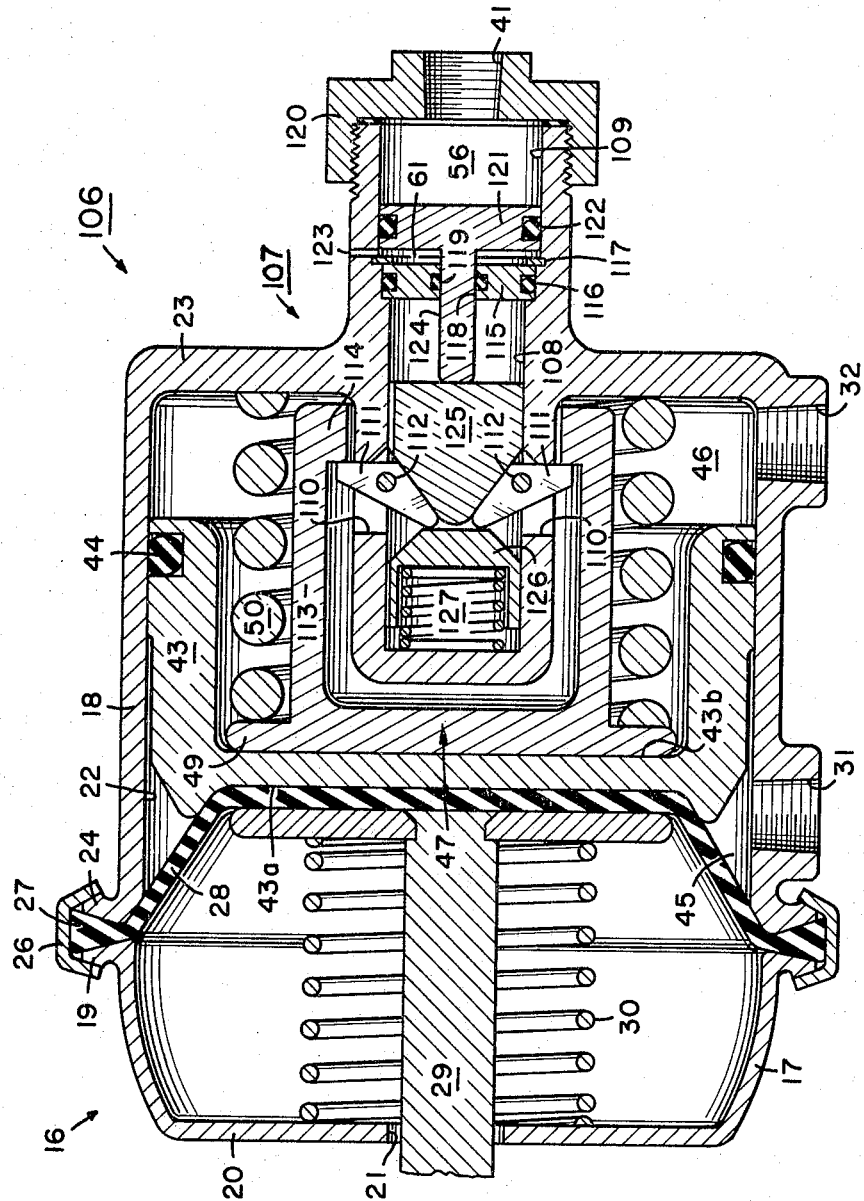

In the drawings which illustrate embodiments of the invention,

FIG. 1 is a diagrammatic view of a fluid pressure system showing a friction device operating mechanism therein embodying the present invention, FIG. 2 is a sectional view showing the friction device operating mechanism of FIG. 1 in cross-section, FIG. 3 is a fragmentary sectional view illustrating an alternate construction for controlling the retention means for the resiliently urged means of the friction device operating mechanism of FIG. 2 in cross-section, FIG. 4 is a sectional view showing another friction device operating mechanism for use in the system of FIG. 1 and also embodied in the present invention, and FIG. 5 is a fragmentary sectional view illustrating an alternate construction for controlling the retention means for the resiliently urged means of the friction device operating mechanism of FIG. 4 in cross-section.

Referring now to FIG. 1 in detail, a fluid pressure system 1 is shown having pressure generating means, such as a compressor 2, connected with a main or service reservoir 3 by a conduit 4, said compressor and main reservoir forming in combination a fluid pressure source. Another conduit 5 is connected between the main reservoir 3 and the modulating or service port of a friction device operating mechanism or actuating cylinder 6 having a modulating valve 7 interposed therein, said friction device operating mechanism being operatively connected with a slack adjustor 8 or the like for controlling the energization of a friction device (not shown). Another conduit 9 is connected between the main reservoir 3 and a protected reservoir 10, and a uni-directional check or flow valve 11 is interposed in said conduit 9 to prevent reduction of pressure fluid in said protected reservoir due to a malfunctioning compressor or leaks or the like in the system 1 ahead of said uni-directional flow valve. Another modulating valve 12 is interposed in a conduit 13 which is connected between an auxiliary modulating or service port of the actuating cylinder 6 and the protected reservoir 10; and it should be noted that the modulating valves 7 and 12 are operable between normal exhausting positions and actuated fluid pressure metering positions and may be either of the hand or foot application type, as desired, both of which are well known in the art. To complete the description of the system 1, a push-pull valve 14, also of a type well known in the art, is interposed in a conduit 15 which is connected between the control port of the actuating cylinder 6 and the main reservoir 3, said push-pull valve being operable between a connecting position providing pressure fluid communication between said main reservoir and said actuating cylinder and a venting position interrupting said pressure fluid communication and exhausting said actuating cylinder control port to the atmosphere.

The actuating cylinder 6, FIG. 2, is provided with a housing, indicated generally at 16, including a cup-shaped end plate 17 and a cylinder 18. The end plate 17 is provided with a peripheral flange 19 adjacent the open end thereof and a base wall 20 having a centrally located aperture 21 therein. The cylinder 18 is provided with a bore 22 therein and an integrally formed end wall or closure member 23 which closes the rightward end of said bore, and a peripheral flange 24 is provided on the cylinder 18 adjacent to the leftward or open end of the bore 22 in opposed relation to the peripheral flange 19 of the end plate 17. The end wall 23 is also provided with a centrally disposed, integrally formed cylindrical extension or hub 25 which is coaxial with the cylinder bore 22.

A conventional clamping band 26 is provided in clamping engagement with the opposed end plate flange 19 and the cylinder flange 24, and the compressive force of said clamping engagement serves to clamp a peripheral bead 27 of a diaphragm or service actuating member 28 in sealing abutting engagement between the flanges 19, 24. A push rod assembly or diaphragm extension 29 extends coaxially through the end plate aperture 21 having an exterior or working end operatively connected with the slack adjustor 8, as previously mentioned, and an interior end connected with the diaphragm 28 by the compressive force of a return spring 30 biased between the push rod 29 and the end plate base wall 20.

The cylinder or housing 18 of the actuating cylinder 6 is provided with a modulating or a service port 31 which receives the conduit 5, as previously mentioned, and intersects the housing bore 22 adjacent the leftward end thereof, and another or auxiliary modulating or service port 32 which receives the conduit 13, as previously mentioned, is also provided in said housing intersecting said housing bore adjacent the rightward end thereof. The hub portion 25 is provided with axial stepped bores 33, 34, 35 having radially extending shoulders 36, 37 therebetween, and an end cap 38 having a peripheral seal 39 sealably engaged with the larger stepped bore 35 is retained against displacement from the rightward end of said larger stepped bore by a snap ring and groove assembly 40 positioned therein, said end cap including a control port 41 which connects with the rightward end of the larger stepped bore 35 and receives the conduit 15, as previously mentioned. A venting or atmospheric passage 42 is provided in the hub 25 intersecting the larger stepped bore 35 adjacent to the mid-portion thereof.

An auxiliary actuating member of piston 43 which is slidable in the housing bore 22 between the housing end wall 23 and the diaphragm 28 is provided with a leftward face or side 43a defining a working end for driving engagement with the diaphragm 28 and an opposed rightward face or side 43b which defines an abutment end, and a seal 44 is provided in the peripheral portion of said actuating piston for sealing engagement with said housing bore. The working end 43a of the actuating piston 43 defines with the diaphragm 28 an expansible fluid pressure modulating or service chamber 45 in open pressure fluid communication with the service port 31, and the abutment end 43b of said actuating piston defines with the housing end wall 23 another expansible fluid pressure or auxiliary service chamber 46 in open pressure fluid communication with the auxiliary service port 32.

A retaining member or piston, indicated generally at 47, is provided with a rod or extension portion 48 slidable in the smaller stepped bore 33 of the hub 25 having a radially extending retainer or abutment portion 49 on the leftward end thereof in the auxiliary service chamber 46, and an emergency spring 50 is biased between said abutment portion and the housing end wall 23 urging said retainer member leftwardly in a friction device energizing direction toward driving engagement with the abutment end 43b of the actuating piston 43 in opposition to fluid pressure expansion of the service chamber 45, said retaining member and spring defining resiliently urged means. A peripheral seal 51 is carried in the rod 48 adjacent the mid-portion thereof in sealing engagement with the smaller stepped bore 33 of the hub 25 to seal the auxiliary service chamber 46 from the intermediate and larger stepped bores 34, 35, and a peripheral groove 52 is provided in said rod between the seal 51 and the rightward or free end of said rod which is coaxial with the larger stepped bore 35.

A control piston 53 having a peripheral seal 54 therein is slidable in the hub larger stepped bore 35, and a return spring 55 is biased between said control piston and the hub shoulder 37 urging said control piston toward the end cap 38. An expansible fluid pressure control chamber 56 is defined in the larger stepped bore 35 between the rightward side or face of the control piston 53 and the end cap 38 in open pressure fluid communication with the control port 41. The control piston 53 is provided with an integral extension 57 which has the leftward or free end thereof slidable in the intermediate stepped bore 34, and a blind bore and counterbore 58, 59 which coaxially receive the rod member 48 are axially provided through the leftward end of the control piston extension 57 with a beveled surface 60 formed between said counterbore and said control piston extension leftward end. It should be noted that an expansible intermediate chamber 61 is defined in the intermediate and larger stepped bores 34, 35 between the rod member seal 51 and the control piston 53 in open pressure fluid communication with the venting passage 42 in the closure member 23 and in opposition to the control chamber 56. To complete the description of the actuating cylinder 6, a plurality of displaceable members or bearings 62 are provided for releasable bearing or locking engagement between the retaining member groove 52 and the hub shoulder 36, said counterbore 59 of the control piston 53 providing an abutment or positioning surface for engagement with said bearings to control the radial displacement thereof from said retaining member groove.

In the operation, assume that normal vehicle operating conditions exist wherein the main reservoir 3 is charged with fluid pressure from the compressor 2 through the conduit 4, and the protected reservoir 10 is charged with fluid pressure from said main reservoir through the conduit 9 and check valve 11. When the modulating valve 7 is actuated, fluid pressure is metered from the main reservoir 3 through the conduit 5 and the service port 31 of the actuating cylinder 6 into the service chamber 45. The fluid pressure so established in the service chamber 45 acts on the effective area of the diaphragm 28 therein creating a force $F_1$ to move said diaphragm and the push rod 29 leftwardly against the return spring 30 toward an operative position actuating the working end of said push rod and the slack adjustor 8 to energize the friction device (not shown) associated therewith. The fluid pressure so established in the service chamber 45 also acts on the effective area of the actuating piston 43 therein creating a force $F_2$ opposite to the force $F_1$ to concertedly urge said actuating piston and the retaining member 47 rightwardly toward their respective inoperative positions (as shown in FIG. 2) against the compressive force $F_s$ of the emergency spring 50. With the retaining member 47 urged into the inoperative position thereof, the peripheral groove 52 in said retaining member is juxtaposed with the hub shoulder 36, and, at this time, the operator may effect retention of the retaining member 47 in its inoperative position by moving the push-pull valve 14 to its connecting position providing pressure fluid flow from the main reservoir 3 through the conduit 15, said push-pull valve and the control port 41 of the actuating cylinder housing 6 into the control chamber 56. The fluid pressure so established in the control chamber 56 acts on the effective area of the control piston 53 therein to create a holding or control force $F_c$ biasing said control piston leftwardly toward its operative position against the return spring 55 wherein the leftward end of the control piston extension 57 engages the hub shoulder 36 to position the control piston counterbore 59 in displacement preventing engagement with the bearings 62. In this manner, the bearings 62 are positively positioned in the retaining member groove 52 against displacement to effect the locking engagement of said bearings between said groove and the hub shoulder 36 and thereby positively retain the retaining member 47 in its inoperative position against movement thereof in the leftward direction toward its operative position. The modulating valve 7 is now moved to its normal or exhaust position to exhaust the fluid pressure in the service chamber 45 to atmosphere through the service port 31, the conduit 5 and said modulating valve thereby simultaneously eliminating the forces $F_1$ and $F_2$, and the diaphragm return spring 30 thereafter serves to return the diaphragm and push rod 28, 29 rightwardly toward their inoperative positions to effect deenergization of the friction device. As described above, the component parts of the system 1 and the actuating cylinder 6 are now positioned as shown in FIGS. 1 and 2.

If the operator desires to make a service application under normal operating conditions to energize the friction device and effect vehicle deceleration or a complete stop, the modulating valve 7 is actuated to meter fluid pressure into the service chamber 45 and re-establish the force $F_1$ to energize the friction device, as described hereinbefore; however, the simultaneous establishment of the force $F_2$ does not affect the position of the actuating piston 43 since said actuating piston is in the inoperative position thereof in abutting engagement with the retaining member 47. Upon the attainment of the desired deceleration or complete stop, the modulating valve 7 is moved to its normal exhaust position to exhaust fluid pressure from the service chamber 45 and simultaneously eliminate the forces $F_1$ and $F_2$ to de-energize the friction device, as described hereinabove.

In the event of a rupture or leak or the like in the diaphragm 28, the fluid pressure metered thereto for a normal service braking application, as described hereinbefore, would, of course, be exhausted through the rupture in said diaphragm and the end plate aperture 21 to the atmosphere; and in this manner, the force $F_1$ could not be effectively established to energize the friction device, and the normal service braking application would be ineffective. Of course, such an ineffective normal service braking application is immediately apparent to the vehicle operator, and in order to effect controlled deceleration or a complete stop under these conditions, the operator may actuate the modulating valve 12 to meter fluid pressure from the protected reservoir 10 through the conduit 13, said modulating valve and the auxiliary service port 32 of the actuating cylinder 6 into the auxiliary service chamber 46. The fluid pressure so established in the auxiliary service chamber 46 acts on the effective area of the actuating piston 43 therein to create an auxiliary service force $F_3$ which moves the actuating piston 43 leftwardly toward its operative position and concertedly drives the diaphragm 28 and the push rod 29 leftwardly against the return spring 30 toward their respective operative positions to energize the friction device. It is apparent that such metered auxiliary service braking application is effective to controllably decelerate the vehicle or to bring the vehicle to a controlled stop, and in this manner, the vehicle may be controllably operated without further loss of fluid pressure through the diaphragm 28 until such rupture can be repaired. In order to de-energize the friction device, the modulating valve 12 is moved to the normal exhausting position thereof to exhaust fluid pressure from the auxiliary service chamber 46 through the auxiliary service port 32, the conduit 13 and said modulating valve to the atmosphere. Upon the exhaustion of fluid presssure from the auxiliary service chamber 46, the force $F_3$ is eliminated, and the return spring 39 moves the diaphragm 28, the push rod 29 and the actuating piston 43 rightwardly toward their inoperative positions..

Of course, if the fluid pressure in the main reservoir 3 is reduced below a predetermined value, or depleted, to effect emergency operating conditions in the system 1 by exhausting the fluid pressure thereof through the ruptured diaphragm 28 during the above-described normal or auxiliary service braking applications, the fluid pressure in the control chamber 56 of the actuating cylinder 6 is also reduced along with a corresponding reduction in the magnitude of the control force $F_c$. Upon the reduction of the fluid pressure in the control chamber 56 to a value less than the predetermined value, the compressive force of the control piston return spring 55 overcomes the reduced control force $F_c$ to move the control piston 53 rightwardly toward abutment with the end cap 38 and thereby move the control piston counterbore 59 rightwardly out of positioning engagement with the bearings 62. With the control piston counterbore 59 displaced from positioning engagement with the bearings 62, the compressive force $F_s$ of the spring 50 overcomes the locking engagement of said bearings between the retaining member groove 52 and the hub shoulder 36 and moves the retaining member 47 leftwardly toward its operative or work-producing position. This resiliently urged movement of the retaining member 47 serves to displace the bearings 62 radially outwardly to a displaced position between the hub intermediate stepped bore 34 and the peripheral surface of the retaining member extension 48 and between the hub shoulder 36 and the control piston beveled surface 60. The resiliently urged leftward movement of the retaining member 47 toward its operative position mechanically drives the actuating piston 43, the diaphragm 28 and the push rod 29 toward their operative positions against the return spring 30 to rotate the slack adjustor 8 and effect mechanical energization of the friction device (not shown) under emergency operating conditions. Since the fluid pressure in the protected reservoir is available to establish the auxiliary force $F_3$ which is additive to the compressive force $F_s$ of the spring 50 under emergency operating conditions, it is apparent that the force $F_s$ of said spring may be designed to be relatively light for vehicle parking purposes (to be discussed hereinafter) and, in this manner, obviate too intense and too erratic mechanical friction device energization under emergency operating conditions. Further, it is also apparent that the actuating cylinder 6 is operable to effect mechanical friction device energization, as described hereinbefore, under emergency operating conditions effected by a malfunctioning compressor or leaks or the like in the system 1 and causing a reduction of fluid pressure in the main reservoir 3 to a value less than the predetermined value.

With the component parts of the system 1 and the actuating cylinder 6 positioned as above described under emergency operating conditions, the friction device is now mechanically energized to effect emergency vehicle stops. When the fluid pressure failure of the system 1 has been corrected and the fluid pressure in the main reservoir 3 is increased to a value greater than the predetermined value wherein normal operating conditions are now re-established, the fluid pressure in the actuating cylinder control chamber 56 is correspondingly increased to re-establish the magnitude of the control force $F_c$ and again urge the control piston 53 leftwardly against its return spring 55 to engage the beveled surface 60 thereon with the displaced bearings 62. In order to de-actuate the cylinder 6 and de-energize the friction device, the operator may again actuate the modulating valve 7 to meter fluid pressure into the actuating cylinder service chamber 45 and re-establish the forces $F_1$ and $F_2$, said force $F_2$ acting to concertedly urge the actuating piston 43 and retaining member 47 rightwardly toward their respective inoperative positions against the compressive force $F_s$ of the spring 50. This rightward movement of the retaining member 47 repositions the groove 52 therein relative to the hub shoulder 36 to again receive the bearings 62, and at the same time the re-established control force $F_c$ moves the control piston 53 leftwardly to again move the counterbore 59 thereof into positioning engagement with the bearings 62. In this manner, the bearings 62 are forced back into their original positions into the groove 52 into locking engagement with the hub shoulder 36 to again retain the retaining member 47 in its inoperative position against the force $F_s$ of the emergency spring 50, and upon the elimination of the forces $F_1$ and $F_2$, the component parts of the actuating cylinder 6 are once again in their inoperative positions for normal service application, as previously described.

Of course, the operator may simulate the emergency operating conditions if he so desires, for instance, for vehicle parking purposes by "dynamiting" the system 1. To "dynamite" the system 1, the operator merely moves the push-pull valve 14 to the venting position thereof exhausting fluid pressure from the actuating cylinder control chamber 56 to the atmosphere through the control port 41, the conduit 15 and said push-pull valve thereby eliminating the control force $F_c$ and simulating the emergency function of the actuating cylinder 6 and mechanically energize the friction device as described hereinbefore.

Referring now to FIG. 3, an alternate hub portion, indicated generally at 75, is integrally provided on the housing end wall 23 of the actuating cylinder 6 having substantially the same construction and accommodating substantially the same component parts as the previously described hub portion 25 with the following exceptions.

The hub portion 75 is provided with an expansible fluid pressure intermediate chamber 76 defined in the intermediate and larger stepped bores 34, 35 thereof between the control piston 53 and the retaining member extension 48, said intermediate chamber 76 being in opposed relation with the control chamber 56. A passage 77 is provided in the hub portion 75 having one end connecting with the auxiliary survice chamber 46 and the other end thereof intersecting with the hub shoulder 36, and another passage 78 is radially provided in the control piston extension 57 interconnected between the bore 58 and the peripheral surface thereof. In this manner, the passages 77, 78 connect the intermediate chamber 76 in open pressure fluid communication with the auxiliary service chamber 46; therefore, fluid pressure established in said auxiliary service chamber is transmitted into the intermediate chamber through said passages and acts on the effective area of the control piston 53 therein to created a force $F_4$ in opposition to the control force $F_c$ and additive to the compressive force of the control piston return spring 55. From the foregoing, it is apparent that the selective establishment of fluid pressure in the auxiliary service chamber 46 to created the force $F_3$ for actuating the actuating piston 43 also creates the force $F_4$, and when the force $F_4$ plus the compressive force of control piston spring 55 attains a magnitude greater than that of the opposing control force, the control piston 53 is moved rightwardly toward its inoperative position to initiate the emergency function of the actuating cylinder 6 wherein the compressive force $F_s$ of the spring 50 urges the retaining member 47 leftwardly toward its operative position displacing the bearings 62 from locking engagement with the hub shoulder 36. In this manner, the retaining member 47 drivingly engages the actuating piston 43 thereby adding the force $F_s$ of the spring 50 to the force $F_3$ to effect friction device energization, as previously described.

Referring now to FIG. 4, another friction device operating mechanism or actuating cylinder 106 is shown having substantially the same component parts and functioning in the system 1 in substantially the same manner as the previously described actuating cylinder 6 with the following exceptions.

The actuating cylinder 106 is provided with a hub portion 107 integrally connected with the housing end wall 23 and having an axial bore and counterbore 108, 109 therein. Opposed radially extending slots 110 are provided through the hub 107 between the auxiliary service chamber 46 and the hub bore 108, and opposed cam members 111 are rotatably mounted for pivotal displacement in said slots on pivot pins 112 retained in said hub. The retaining member 47 is provided with an annular extension 113 which is coaxial with the hub 107, and an annular flange 114 is provided on the free end of said extension for holding or locking engagement with the cams 111 when said retaining member is in the inoperative position thereof. A wall member 115 having a peripheral seal 116 engaged with the hub counterbore 109 is positioned in engagement with the shoulder formed between the hub bore and counterbore 108, 109 by a snap ring and groove assembly 117 positioned in said hub counterbore, and an aperture 118 is axially provided through said wall member having another seal 119 disposed therein. An end cap 120 which includes the control port 41 is threadedly received on the rightward or exterior end of the hub 107, and a control piston 121 having a peripheral seal 122 therein is slidably disposed in the hub counterbore 109 between the wall member 115 and said end cap. The control chamber 57 is defined in the hub counterbore 109 between the control piston 121 and the end cap 120, and the intermediate chamber 61 is also defined in said hub counterbore between said control piston and the wall member 115, said intermediate chamber being vented to atmosphere by a vent passage 123 in said hub 107. A control piston extension 124 is slidable in the wall aperture 118 in sealing engagement with the seal 119 therein and has an end connected with the control piston 121 while the other or free end thereof extends into the hub bore 108 for engagement with an abutment member 125 which is slidable in the hub bore 108. The abutment member 125 is engaged with the cams 111 to control the pivotal displacement thereof about the pivot pins 112 into and out of holding engagement with the retaining member flange 114 in response to the holding force $F_c$ acting on the control piston 121, and the force $F_s$ of the spring 50 acts against the holding force $F_c$ when the cams 111 are engaged with the retaining member flange 114 to maintain the retaining member 47 in its inoperative position. To complete the description of the actuating cylinder 106, a cam positioning piston 126 is slidable in the hub bore 108 in opposition to the abutment member 125 and engaged with the cams 111, and a spring 127 urges the cam positioning piston 126 rightwardly in a direction to maintain said cams in engagement with the abutment member 125.

In the operation when the holding force $F_c$ is reduced under emergency operating conditions to a magnitude less than that of the force $F_s$ of the spring 50, the force $F_s$ moves the retaining member 47 leftwardly toward its operative position for driving engagement with the actuating piston 43 to mechanically energize the friction device, as previously discussed. This leftward movement of the retaining member 47 rotates the cams 111 in opposite directions about the pivot pins 112 to move the abutment member 125 and control piston 121 rightwardly toward their inoperative positions in the hub bore and counterbore 108, 109, respectively. Such rotation of the cams 111 a predetermined amount, of course, effects the disengagement thereof from the retaining member flange 114 permitting the aforementioned resiliently urged movement of the retaining member 47 toward its operative position, and the spring 127 urges the cam positioning piston 126 into following engagement with the displaced cams 111 to maintain said cams in a displaced position providing clearance between said cams and said retaining member flange upon subsequent movement of said retaining member to the inoperative position thereof.

When normal operating conditions again prevail in the system 1 and the force $F_2$ is re-established to concertedly move the actuating piston 43 and the retaining member toward their respective inoperative positions, the operator may again re-establish the control force $F_c$, as previously described, which serves to move the control piston 121 and extensions 124, 125 leftwardly toward their operative positions against the cam positioning piston 126 and spring 127. The leftward movement of the control piston 121 and extensions 124, 125 drivingly rotates the cams 111 in opposite directions about the pivot pins 112 to their positions for holding or locking engagement with the retaining member flange 114; therefore, upon the elimination of the force $F_2$, the cams 111 are again responsive to the holding force $F_c$ to maintain the retaining member 47 in its inoperative position.

Referring now to FIG. 5, an alternate hub portion, indicated generally at 137, is integrally provided on the housing end wall 23 of the actuating cylinder 106 having substantially the same constructions and accommodating substantially the same component parts as the previously described portion 107.

The hub portion 137 is provided with a bore 138, and the end cap 120 is threadedly received on the exterior end of said hub portion. A control piston 139 having a peripheral seal 140 therein is slidable in the hub bore 138, and the control chamber 56 is defined in said hub bore between said control piston and the end cap 120 in open pressure fluid communication with the control port 41. The control piston 139 is provided with a substantially conical cam abutment surface 141 on the leftward end thereof. The cam slots 110 are provided in the hub 137 having one end intersecting with the hub bore 138 and the other end thereof connecting with the auxiliary service chamber 46, and the cams 111 are pivotally mounted on the pivot pins 112 which are retained in the hub 137. The cam positioning piston 126 is slidable in the hub bore 138 and urged into follow-up abutting engagement with the cams 111 by the spring 127 in opposition to the control piston 139. Since the hub bore 138 leftwardly of the control piston 139 is in open pressure fluid communication with the auxiliary service chamber 46 through the cam slots 110, fluid pressure selectively introduced in said auxiliary service chamber to establish the force $F_3$, as previously described, is transmitted into the hub bore 138 acting on the effective area of the control piston 139 therein to create the force $F_4$ which is additive to the force $F_s$ of the spring 50 plus the compressive force of the spring 127 in opposition to the control force $F_c$ urging said control piston into displacement preventing engagement with the cams 111. When the force $F_4$ plus the force $F_s$ and the compressive force of the spring 127 attain a magnitude greater than the opposing control force $F_c$, the control piston 139 is moved rightwardly toward its inoperative position permitting rotation of the cams 111 in opposite directions about the pins 112 to a displaced position out of holding engagement with the retaining member flange 114. Such rotation of the cams 111 to their displaced positions disengaged from the retaining member flange 114 initiates the emergency function of the actuating cylinder 106 wherein the force $F_s$ of the spring urges the retaining member 47 toward its operative position, and said retaining member drivingly engages the actuating piston 43 thereby adding the force $F_s$ of said spring to the force $F_3$ to effect friction device energization, as previously described.

In order to return the retaining member 47 to its inoperative position, the control force $F_c$ is eliminated by venting the control chamber 56 to atmosphere, as previously described, and the spring 127 urges the cam positioning piston 126 to a completely displaced position against the control piston 139 to provide clearance between the retaining member flange 114 and said cams upon subsequent movement of said retaining member to its inoperative position. Exhaustion of the fluid pressure from the auxiliary service chamber 46 and the introduction of fluid pressure into the service chamber 45 eliminates the force $F_3$ and re-establishes the force $F_2$ which is again effective to move the actuating piston 43 and the retaining member 47 to their respective inoperative positions against the force $F_s$ of the spring 50. With the retaining member in the inoperative position thereof, the operator may re-establish the control force $F_c$, as previously described, which serves to move the control piston 139 leftwardly in the hub bore 138 toward its cam positioning or operative position against the piston and spring 126, 127. This leftward movement of the control piston 139 drivingly rotates the cams 111 in opposite directions on their pins 112 into their positions for locking or holding engagement with the retaining member flange 114; therefore, upon the subsequent exhaustion of the service chamber 45 to eliminate the force $F_2$, the cams 111 are again responsive to the control force $F_c$ urging the control piston 139 into displacement preventing engagement therewith to maintain the retaining member in its inoperative position against the force $F_s$ of the spring 50.

It is now apparent that novel friction device operating mechanisms or actuating cylinders 6, 106 meeting the objects and advantages set out hereinbefore, as well as other objects and advantages apparent from the disclosure, are provided and that changes in the precise configurations, shapes or details of the constructions set forth in the disclosure by way of illustration may be made by those skilled in the art without departing from the spirit of the invention, as defined by the claim which follows.

The embodiments of the invention in which an exclusive property or privilege is claimed are defined as follows:

A friction device operating mechanism comprising a housing having extension means thereon, a pair of expansible fluid pressure chambers in said housing, a pair of actuating means movable between operative and inoperative positions in said housing and defining therewith one of said chambers, one of said actuating means defining with said housing the other of said chambers, resiliently urged means movable in said other chamber between operative and inoperative positions including means substantially coaxial with said housing extension means, said resiliently urged means being movable toward its operative position to mechanically drive said one and other actuating means in concert toward their respective operative positions, said one and other actuating means being respectively oppositely urged toward their inoperative and operative positions in response to fluid pressure selectively established in said one chamber and said resiliently urged means also being concertedly urged with said one actuating means toward its inoperative position, displaceable means movable in said housing extension means for releasable retaining engagement with said included means, control means movable in said housing extension means for controlling engagement with said displaceable means and defining with said housing extension means an expansible fluid pressure control chamber, an effective fluid pressure responsive area on said control means in said control chamber, said control means being movable in one direction in response to control fluid pressure in said control chamber acting on said area to urge said displaceable means into retaining engagement with said included means to retain said resiliently urged means in its inoperative position and positively contain the force thereof, said one actuating means being thereafter movable toward its operative position independently of said resiliently urged means upon the retention thereof in its inoperative position in response to the selective establishment of metered fluid pressure in said other chamber to concertedly drive said other actuating means toward its operative position in the event of fluid pressure failure in said on chamber, and another effective fluid pressure responsive area on said control means opposed to said first named area, passage means in said housing extension means and said control means for subjecting said other area to the established fluid pressure in said other chamber, said control means also being movable in another direction opposite the one direction in response to the established fluid pressure in said other chamber in excess of a predetermined value acting on said other area toward a position permitting movement of said displaceable means out of retaining engagement with said included means, and said resiliently urged means being thereafter movable toward its operative position in driving engagement with said one actuating means wherein the force thereof is additive to that of the fluid pressure in said other chamber acting on said one actuating means.

References Cited

UNITED STATES PATENTS

| | | | |
|---|---|---|---|
| 2,773,485 | 12/1956 | Geyer | 92—17 |
| 2,873,579 | 2/1959 | Safford | 92—28 |
| 3,175,473 | 3/1965 | Boteler et al. | 92—130 X |
| 3,177,779 | 4/1965 | Dobrikin et al. | 92—27 X |
| 3,182,566 | 5/1965 | Berg et al. | 92—24 |
| 3,183,791 | 5/1965 | Cruse | 92—24 |
| 3,260,168 | 7/1966 | Cruse | 92—24 |
| 3,282,169 | 11/1966 | Leighton | 92—24 |

FOREIGN PATENTS 810,901  3/1959  Great Britain.

MARTIN P. SCHWADRON, *Primary Examiner.*

I. C. COHEN, *Assistant Examiner.*